April 21, 1959 F. T. BAILEY 2,883,559
RADIATION LEVEL COMPENSATOR SYSTEM
Filed Oct. 7, 1955
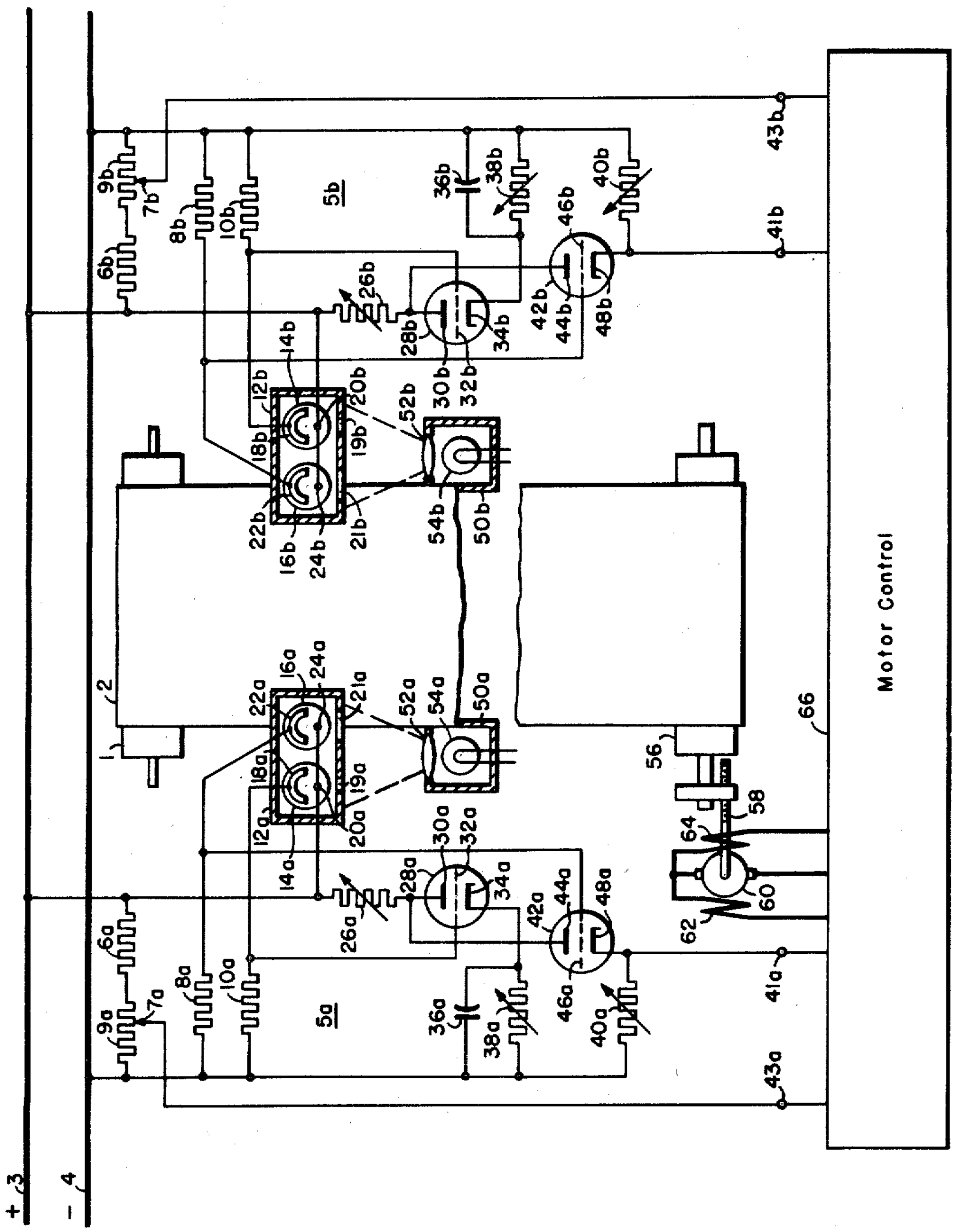
WITNESSES
Edwin G. Baesler
John B. Davidson
INVENTOR
Francis T. Bailey
BY
Paul E. Friedemann
ATTORNEY United States Patent Office 2,883,559

Patented Apr. 21, 1959

2,883,559

RADIATION LEVEL COMPENSATOR SYSTEM

Francis T. Bailey, East Aurora, N.Y., assignor to Westinghouse Electric Corporation, East Pittsburgh, Pa., a corporation of Pennsylvania

Application October 7, 1955, Serial No. 539,050

6 Claims. (Cl. 250—219)

This invention relates generally to electric systems for the control of the lateral position of traveling webs to maintain the web in a desired operating position and more particularly to devices for detecting the instantaneous position of webs controlled by such systems.

In the control of the lateral position of a longitudinally moving web, it is customary to use a photoelectric scanner to detect the instantaneous position of the web and to generate an electric signal indicative of the deviation of the instantaneous position of the web from a given reference position. This signal is amplified and used to vary the speed and direction of rotation of a motor that is connected to a stand or other means supporting the web, and further to physically move the web laterally to the direction of travel thereof. The photoelectric scanner normally comprises a small lamp, a phototube or similar light sensitive devices to detect the light transmitted from the lamp, and a lens system for focusing the light onto the light detector. The scanner continuously inspects some reference point on the web, for example, the outer edge thereof, to determine its position and feeds an electrical signal to an amplifier and exciter for the purpose of repositioning a motor to provide mechanical motion as a function of the output of the amplifier. The web is accordingly repositioned in the direction of the aforementioned reference position thereof. Typical control systems of this nature may be found in U.S. Patent No. 2,117,878 to P. E. Friedemann, Patent No. 2,220,736 to D. C. Stockbarger et al., and Patent No. 2,444,261 to L. U. C. Kelling.

It is apparent that in a system such as described above, should there be a diminution in the intensity of light falling on the light detector for reasons other than movement of the web (typical of such reasons being aging of the phototube or collection of dirt and dust on the lens system), the lateral position of the web will be adjusted by the control system in an effort to correct the light variation. After such movement, the position of the web will be away from the reference position, and will be in error insofar as regulator operation is concerned. Should duplicate connection systems be used for each edge of the web to respectively move the web in opposite directions, as normally is the case, lateral oscillations can be built up by the cross-connection that may become so violent as to disrupt the web or to cause the correction systems to entirely lose control of the movement of the web.

Accordingly, one object of this invention is to provide an improved system for control of the lateral position of a traveling web relative to its direction of longitudinal travel.

Another object is to provide a radiation sensitive detecting head for detecting the presence of a body relative to a radiation source and a radiation detection device, wherein the output signal is relatively unaffected by variations in intensity of the radiation emanated by the source.

Still another object is to provide a radiation sensitive detecting head for the control of a traveling web utilizing a radiation source and a radiation detecting element for detecting the presence of the web therebetween, wherein variations in the ambient radiation level will be ineffective to reposition the web.

Other objects and features of this invention will become apparent from a consideration of the following description therefor, when taken in connection with the accompanying drawing, wherein the single figure represents a typical embodiment of a traveling web control system according to this invention.

According to one aspect of this invention, two radiation sensitive devices are positioned so as to be irradiated by radiation from a single source. One of the devices is positioned so that the radiation falling thereon is indicative of the position of a web or other member relative thereto. The other device is positioned so that the web can not vary the intensity of the radiation falling thereon, that radiation impinging thereon being indicative only of the intensity of the total radiation emanating from the source. The output signals from the two radiation sensitive devices are coupled to individual amplifier valves which have a common impedance connecting them to a source of operating potential, so that diminution of the current drawn by one of the valves will tend to increase the voltage supplied to both valves from the potential source and thus increase the relative sensitivity of the second valve. Thus, upon a change in the quantum of radiation from the source of radiation, the second radiation sensitive device will vary the sensitivity of the amplifier coupled to the other radiation sensitive device in such a sense as to maintain the output signal constant (assuming no change in the position of the control member).

With reference now to the single figure of the drawing, there is shown a traveling web strung between an unwinding reel 1 and a winding reel 56, the winding reel being driven by a drive motor (not shown). The winding reel 56 is positioned laterally by means of a drive motor driving a screw-threaded shaft 58 to move the carriage of the motor, either to the right or left as shown depending on the direction of rotation of the motor 60. Motor 60 has separately energized fields 62 and 64 which are energized by a motor control system 66 which may be any suitable system well-known to the art such as described in the aforementioned patents, and more particularly, such as the side position control system described in Westinghouse Electric Corporation Descriptive Bulletin 18–30, published in September 1952. The function of the motor control system is to energize fields 62 and 64 so as to drive motor 60 in one direction or the other in accordance with signals imparted from output terminal pairs **41*a*, 43*a* and 41*b*, 43*b* of detecting heads 5*a* and 5*b*, respectively. Detecting heads 5*a* and 5*b* are duplicate systems for respectively imparting output signals so as to move the traveling web 2 to the right and to the left, respectively, upon deviation of the web from a given reference position. As an alternative to the use of a D.C. motor as described above, a variable voltage motor control system may be used wherein the direction and speed of motor rotation is controlled by the polarity and magnitude of a D.C. generator energizing the armature of the motor. In this case, control 66** would energize the field of the generator to control the polarity and magnitude of the output voltage therefrom.

A detailed description of only detecting head **5*a* will be given below, the details of the circuitry of detecting head 5*b*** being exactly the same and component parts having identical reference numerals performing the same function in the same manner.

Detecting head **5*a* utilizes a light source 50*a* including a lamp 54*a* and a lens system 52*a***. Light from the lamp 54a is directed by lens 52a to apertures 19a and 21a in an enclosure 12a for phototubes 14a and 16a. Light passing through aperture 19a will fall only upon the light sensitive element or cathode 18a of phototube 14a; similarly, light passing through aperture 21a will fall upon the cathode 22a of phototube 16a. The function of phototube 16a is to indicate either the presence of the left edge of traveling web 2 between source 50a and the phototube 16a while the phototube 14a is positioned sufficiently to the left of the travel web so that at no time can the web intercept light rays directed to phototube 14a from light source 50a.

Resistor 8a couples phototube 16a to a source of operating potential having a positive bus 3 and a negative bus 4, the anode 24a and cathode 22a of phototube 16a being respectively connected to the positive bus 3 and to resistor 8a, the other terminal of resistor 8a being connected to bus 4. In similar manner, resistor 10a connects phototube 14a across buses 3 and 4, the anode 20a and the cathode 18a thereof being respectively connected to positive bus 3 and resistor 10a. The voltages appearing across resistors 8a and 10a will respectively be proportional to the current flowing through phototubes 16a and 14a, and thus proportional to the amount of light falling upon the phototubes.

A pair of triode vacuum tubes 28a and 42a are provided which have their respective control electrodes 32a and 46a connected to phototube cathodes 18a and 22a. The plates 44a and 30a of vacuum tubes 28a and 42a are connected to the positive bus 3 through the same or common plate impedance 26a. Cathode 34a of vacuum tube 28a is connected to negative bus 4 through parallel-connected resistors 38a and capacitor 36a, the capacitor serving as a by-pass condenser for the resistor 38a. Cathode 48a of vacuum tube 42a is connected to negative bus 4 through unbypassed resistor 40a, so that vacuum tube 42a is effectively a cathode-follower type amplifier. The output terminal 41a for detecting head 5a is connected to cathode 48a, while output terminal 43a thereof is connected to tap 7a on potentiometer 9a, which potentiometer is connected between buses 3 and 4 by means of resistor 4a. The function of potentiometer 9a is to vary the output voltage of the detecting head 5a in accordance with the control requirements of the system and to compensate for variations in the characteristics of the vacuum tubes. Resistors 26a, 38a and 40a are preferably variable resistors so as to further aid in compensating for variations in the characteristics of the vacuum tubes.

As mentioned above, the structure of detecting head 5b is the same as that of detecting head 5a, with the exception that phototube 14b is to the right of phototube 16b instead of to the left thereof as is the position of phototube 14a relative to phototube 16a. Phototubes 16a and 16b may be positioned so that with the web 2 in its reference position as shown, a maximum amount of light will be transmitted from the light sources 50a, 50b to the respective tubes, movement of the web either to the right or to the left diminishing the amount of light reaching one or the other of the phototubes 16a, 16b, and diminishing the current flowing therethrough. Alternatively, the phototubes may be positioned so that a portion of the maximum light that may reach each phototube is blocked with the web in its reference position, the phototubes being oppositely affected by movement of the web insofar as the amount of light reaching them is concerned.

To understand the operation of the detecting head, let is be assumed that the system is in operation with the web in its reference position. Should the amount of light from source 50a diminish as a result of aging of the tube, dirt accumulation on the lens, or other reasons, the current through resistor 8a will tend to diminish, thus decreasing the current through vacuum tube 42a and the voltage across output resistor 40a and plate resistor 26a. However, the intensity of the light reaching phototube 14a will diminish proportionally, decreasing the current through the phototube 14a and the voltage drop across resistor 10a. This will change the bias on grid 32a so as to decrease the plate current of vacuum tube 28a and further decrease the voltage drop across resistor 26a. The voltage on plate 30a will increase; by properly adjusting the valves of resistors 38a, 8a and 26a, the decrease of the voltage drop across resistor 26a may be made sufficient to balance the effect of the voltage drop across resistor 8a insofar as the effect on the cathode-to-plate current of vacuum tube 42a is concerned, thus maintaining the cathode-to-plate current and the output voltage appearing across terminals 41a, 43a relatively constant. The output voltage will thus remain constant with variation in ambient light level as detected by phototube 14a so that there will be no repositioning of roller 56 and traveling web 2.

Typical values of the various circuit elements which have been found to be effective in a system constructed as described above are as follows:

| | |
|---|---|
| Phototubes 18a and 16a | 1P40. |
| Resistor 6a | 330,000 Ω. |
| Resistor 8a | 4.7 megohms. |
| Resistor 10a | 4.7 megohms. |
| Resistor 26a | 250,000 ohms. |
| Resistor 38a | 1500–4700 ohms. |
| Resistor 40a | 1500–4700 ohms. |
| Potentiometer 9a | 100,000 Ω. |
| Vacuum tube 28a | 6SL7 or 6SN7. |
| Vacuum tube 42a | 6SL7 or 6SN7. |

The invention is not to be restricted to the specific structural details, arrangement of parts or circuit connections herein set forth, as various modifications thereof may be effected without departing from the spirit and scope of this invention. For example, the radiation source 50a which is depicted in the drawing as a light source, may be a radioactive source emitting beta rays, such as thallium 204; the phototubes 14a and 16a may be replaced by suitably encapsulated transistor elements that are responsive to radioactive emanations. Additionally, the transistors may be encapsulated in such a manner as to transmit suitable radioactive emanations and not to transmit light rays. This system then corrects for variations in the radioactive background and in variations due to the progressive decrease in radioactivity of the radioactive source.

I claim as my invention:

1. In a control system for correcting for the lateral departure of a longitudinally moving web from a predetermined position, the combination of a light source positioned on one side of the web, first photosensitive means positioned on the opposite side of said web such that the amount of light transmitted from said source to said first photosensitive means provides a first output signal from said first photosensitive means indicative of the departure of said web from said predetermined position, first control means responsive to said first output signal for laterally moving said web toward said predetermined position, second photosensitive means positioned with respect to said light source and said web so that said web at no time can interrupt the impingement of said light from said source on said second photosensitive means, said second photosensitive means being adapted to provide a second output signal indicative of the amount of light impinging thereon from said source, and second control means connected to said first and second photosensitive means for varying the sensitivity of said first photosensitive means, said second control means being responsive to said second output signal to maintain constant the magnitude of said first output signal with variation in the intensity of light impinging on said second photosensitive means.

2. In a control system for correcting for the lateral departure of a longitudinally moving web from a predetermined position, the combination of a photoelectric scanning device positioned along one edge of said web and including a light source positioned on one side of the web and first photosensitive means positioned on the opposite side of said web such that the amount of light transmitted from said source to said first photosensitive means provides a first output signal from said first photosensitive means indicative of the departure of said web from said predetermined position, first control means responsive to said first output signal for laterally moving said web toward said predetermined position, second photosensitive means positioned with respect to said light source and said web such that said web at no time can interrupt the impingement of said light from said source on said second photosensitive means, said second photosensitive means being adapted to provide a second output signal indicative of the amount of light impinging thereon from said source, and second control means in circuit relationship with said first and second photosensitive means for varying the sensitivity of said first photosensitive means, said second control means being responsive to said second output signal to maintain constant the magnitude of said first output signal with variation in the intensity of light impinging on said second photosensitive means, said second control means including a source of regulated voltage and first and second resistance elements respectively coupling said first and second photosensitive means across said source of regulated voltage, said second control means further including first and second vacuum tubes each having at least cathode, plate and control electrodes and a common plate impedance for said first and second vacuum tubes coupling each of said vacuum tubes in series with said source of regulated voltage, with said first and second resistance elements being respectively coupled to said control electrodes of said first and second vacuum tubes.

3. In a control system for correcting for the lateral departure of a longitudinally moving web from a predetermined position, the combination of a photoelectric scanning device positioned along one edge of said web, said device including a light source positioned on one side of the web and first photosensitive means positioned on the opposite side of said web such that the amount of light transmitted from said source to said first photosensitive means provides a first output signal from said first photosensitive means indicative of the departure of said web from said predetermined position, first control means responsive to said first output signal for laterally moving said web toward said predetermined position, second photosensitive means positioned with respect to said light source and said web such that said web at no time can interrupt the impingement of said light from said source on said second photosensitive means, said second photosensitive means being adapted to provide a second output signal indicative of the amount of light impinging thereon from said source, and second control means in circuit relationship with said first and second photosensitive means for varying the sensitivity of said first photosensitive means, said second control means being responsive to said second output signal to maintain constant the magnitude of said first output signal with variation in the intensity of light impinging on said second photosensitive means, said second control means including first and second electric valve means each having at least three electrodes including a control electrode for controlling current flow between the other two electrodes, a source of regulated voltage, a common impedance for coupling each of said valve means in series with said voltage source and adapted to receive said current flow of each of said valve means, said first electric valve means being connected in cathode-follower configuration to provide an output circuit for said scanning device, and first and second resistance means respectively coupling said first and second photosensitive means across said source of regulated voltage and being further respectively coupled to said control electrodes of said first and second valve means.

4. In a photoelectric scanning device operative with a source of voltage for detecting the presence of a body, the combination of a light source and a first photoelectric light detector positioned on opposite sides of said body, a first impedance element for coupling said light detector across said voltage source, a cathode-follower type amplifier energized from said voltage source and having an input circuit, said input circuit being coupled across said impedance element, a second light detector for measuring the intensity of radiation from said light source irrespective of the presence of said body between said light source and said first detector, a second impedance element for coupling said second detector across said voltage source, and control means responsive to voltage variations across said second impedance element for varying the magnitude of energizing voltage applied to said cathode-follower type amplifier inversely as the intensity of light from said source reaches said second detector.

5. A photoelectric scanning device operative with a regulated voltage source for providing an output signal having a magnitude indicative of the position of an object relative to a given position, the combination of a first photosensitive element and a light source positioned on opposite sides of said object, with said first photosensitive element having a first output signal that varies as a function of the variation in the position of said object, first and second electric valves each including at least a control electrode, with the current through each of said valves being variable in accordance with the voltage on its respective control electrode, a common impedance coupling each of said valves in series with said source of regulated voltage so that variation in the current through one valve will vary the voltage across and the current through the other valve, a second photosensitive element positioned relative to said light source such that the latter element has a second output signal that is relatively unaffected by movement of said object and is indicative of the ambient light level in the vicinity of said first photosensitive element, with the first and second output signals from said first and second photosensitive elements being coupled to the control electrodes of said first and second electric valves, respectively, so that a reduction in magnitude of the second output signal from said second photosensitive element as a result of reduction in intensity of light from said light source will increase the voltage controlled by the first output signal operative with said first valve and maintain constant the current through said first electric valve.

6. In apparatus operative with a voltage source for providing an output signal having a magnitude indicative of the position of an object relative to a given position, the combination of a source of radiation and a first radiation sensitive element positioned relative to said object such that said element provides a first output signal that varies as a function of the variation in the position of said object relative to said given position, first and second electric valves each including at least a control electrode, with the current through each of said valves being variable in accordance with the voltage on its respective control electrode, a common impedance element coupling each of said valves in series with said voltage source so that a variation in current through one valve will vary the current through and the voltage across the other valve, a second radiation sensitive element for providing a second output signal and being positioned with respect to said radiation source and said object so that the quantum of radiation detected thereby is unaffected by movement of said object, with said first and second output signals from said first and second radiation sensitive elements being coupled to said control electrodes of said first and second electric valves, respectively, so that a reduction in the magnitude of the second output signal from said second photosensitive element as a result of reduction in intensity of light from said light source will increase the voltage controlled by said first output signal applied to said first valve to maintain constant the current through said first electric valve.

References Cited in the file of this patent

UNITED STATES PATENTS

| | | |
|---|---|---|
| 2,220,736 | Stockbarger | Nov. 5, 1940 |
| 2,241,743 | Schoene | May 13, 1941 |
| 2,420,058 | Sweet | May 6, 1947 |
| 2,510,347 | Perkins | June 6, 1950 |